(12) United States Patent
Vijayasankar et al.

(10) Patent No.: US 9,276,764 B2
(45) Date of Patent: Mar. 1, 2016

(54) ENHANCED CARRIER SENSE MULTIPLE ACCESS (CSMA) PROTOCOLS (71) Applicant: Texas Instruments Incorporated, Dallas, TX (US)

(72) Inventors: Kumaran Vijayasankar, Allen, TX (US); Ramanuja Vedantham, Allen, TX (US); Anand G. Dabak, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/706,118

(22) Filed: May 7, 2015

(65) Prior Publication Data

US 2015/0244541 A1 Aug. 27, 2015

Related U.S. Application Data (62) Division of application No. 13/593,428, filed on Aug. 23, 2012, now Pat. No. 9,030,932.

(60) Provisional application No. 61/535,603, filed on Sep. 16, 2011, provisional application No. 61/526,761, filed on Aug. 24, 2011.

(51) Int. Cl.
H04L 12/413 (2006.01)
H04B 3/54 (2006.01)
H04L 29/06 (2006.01)

(52) U.S. Cl.
CPC ............. *H04L 12/413* (2013.01); *H04B 3/54* (2013.01); *H04B 3/542* (2013.01); *H04L 69/02* (2013.01); *H04B 2203/5408* (2013.01); *H04B 2203/5433* (2013.01)

(58) Field of Classification Search
CPC .................................................... H04L 12/413
See application file for complete search history.

(56) References Cited

U.S. PATENT DOCUMENTS

| 7,586,932 | B2* | 9/2009 | Chou et al. ............... 370/445 |
| 2004/0264423 | A1* | 12/2004 | Ginzburg et al. ......... 370/338 |
| 2005/0070317 | A1* | 3/2005 | Liu .......................... 455/502 |
| 2008/0279210 | A1* | 11/2008 | Naka et al. ............... 370/448 |

* cited by examiner

*Primary Examiner* — Robert M Morlan
(74) *Attorney, Agent, or Firm* — Steven A. Shaw; Frank D. Cimino (57) ABSTRACT Systems and methods for enhanced carrier sense multiple access (CSMA) protocols are described. In various implementations, these systems and methods may be applicable to Power Line Communications (PLC). For example, a method may include attempting to access a communications channel to transmit a frame after a backoff time proportional to a randomly generated number within a contention window (CW), the CW having an initial value carried over from a previous transmission of a different frame. Additionally or alternatively, some of techniques described herein may facilitate the spreading of the time over which devices attempt to transmit packets, thereby reducing the probability of collisions using, for example, Additive Decrease Multiplicative Increase (ADMI) mechanisms.

20 Claims, 6 Drawing Sheets

ENHANCED CARRIER SENSE MULTIPLE ACCESS (CSMA) PROTOCOLS

CROSS-REFERENCE TO RELATED APPLICATIONS

This application is a Divisional of and claims priority to U.S. patent application Ser. No. 13/593,428, filed on Aug. 23, 2012—now U.S. Pat. No. 9,030,932 issued on May 12, 2015. Said application claims the benefit of the filing date of U.S. Provisional Patent Application No. 61/526,761, which is titled "Additive Decrease Multiplicative Increase—CSMA/CA" and was filed on Aug. 24, 2011, and of U.S. Provisional Patent Application No. 61/535,603, which is titled "Efficient Contention Window (CW) Management Using Return to Maximum CW" and was filed on Sep. 16, 2011, the disclosures of which are hereby incorporated by reference herein in their entirety.

TECHNICAL FIELD

Embodiments are directed, in general, to communications, and, more specifically, to enhanced Carrier Sense Multiple Access (CSMA) protocols.

BACKGROUND

There are several different types of communication networks available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for enhanced Carrier Sense Multiple Access (CSMA) protocols are described. In an illustrative embodiment, a method may include attempting to access a communications channel to transmit a frame after a backoff time proportional to a randomly generated number (K) within a contention window (CW), the CW having an initial value carried over from a previous transmission of a different frame. The method may also include, in response to: (i) reaching a predetermined number of attempts without having obtained access to the communications channel, or (ii) having transmitted the frame over the communications channel upon the expiration of a backoff time without having received a corresponding acknowledgement, increasing the CW and attempting to access the communications channel to transmit or re-transmit the frame after another backoff time proportional to another K within the increased CW.

In some embodiments, increasing the CW may include doubling the CW up to a value smaller than or equal to a maximum CW value. For example, the method may include doubling the maximum CW value in response to an average CW over a predetermined number of previous attempts to access the communications channel being greater than a first threshold, and/or halving the maximum CW value in response to the average CW over the predetermined number of previous attempts to access the communications channel being smaller than a second threshold different from the first threshold. In some cases, the first threshold may be equal to the maximum CW value divided by 2, and the second threshold may be equal to the maximum CW value divided by 4. Additionally or alternatively, the method may include doubling the maximum CW value in response to an average K over a predetermined number of previous attempts to access the communications channel being greater than a first threshold, and/or halving the maximum CW value in response to the average K over the predetermined number of previous attempts to access the communications channel being smaller than a second threshold different from the first threshold.

In some cases, the method may include, in response to the backoff time reaching a maximum backoff time value, resetting the CW to a minimum CW value. Moreover, the method may include, in response to (i) having transmitted the frame over the communications channel upon the expiration of the backoff time, or (ii) having transmitted the frame over the communications channel upon the expiration of the backoff time and having received a corresponding acknowledgement, decreasing the CW, and attempting to access the communications channel to transmit another frame after yet another backoff time proportional to yet another randomly generated number within the decreased CW. For example, the method may include linearly decreasing the CW to a value greater than or equal to a minimum CW value.

After a predetermined number of attempts to access the communications channel with the CW set to a minimum CW value, the method may include setting the CW to a maximum CW value. Further, after a predetermined number of attempts to access the communications channel, the method may include setting the CW to a minimum CW value.

In another illustrative, non-limiting embodiment, a communications device may include a processor and a memory coupled to the processor, the memory configured to store program instructions executable by the processor to cause the communications device to perform one or more operations. For example, the device may attempt to access a communications channel to transmit a frame after a backoff time proportional to a randomly generated number within a CW having an initial value carried over from a previous transmission of a different frame, decrease the CW in response to having transmitted the frame over the communications channel upon the expiration of the backoff time, and attempt to access the communications channel to transmit another frame after another backoff time proportional to another randomly generated number within the decreased CW.

In some implementations, to decrease the CW, the communications device may decrease the CW to a value greater than or equal to a minimum CW value. Additionally or alternatively, to decrease the CW, the communications device may use a logarithmic decreasing function, a quadratic decreasing function, or a polynomial decreasing function. After a predetermined number of attempts to access the communications channel with the CW set to a minimum CW value, the communications device may set the CW to a maximum CW value.

In yet another illustrative, non-limiting embodiment, a non-transitory electronic storage medium may have program instructions stored thereon that, upon execution by a processor within a communications device, cause the communications device to perform one or more operations. For example, the communications device may attempt to access a communications channel to transmit a frame after a backoff time proportional to a randomly generated number within a CW having an initial value carried over from a previous transmission of a different frame, and then: (a) increase the CW and attempt to access the communications channel to transmit the frame after another backoff time proportional to another randomly generated number within the increased CW in response to (i) a determination that the communications channel is not available upon expiration of the backoff time or (ii) a transmission of the frame over the communications channel upon the expiration of the backoff time not being followed by a corresponding acknowledgement; or (b) decrease the CW and attempt to access the communications channel to transmit another frame after yet another backoff time proportional to yet another randomly generated number within the decreased CW in response to a transmission the frame over the communications channel upon the expiration of the backoff time being followed by the corresponding acknowledgement.

In some cases, to increase the CW, the communications device may increase the CW to a value smaller than or equal to a maximum CW value, and, to decrease the CW, the communications device may decrease the CW to a value greater than or equal to a minimum CW value. Moreover, the communications device may double the maximum CW value in response to an average CW over a predetermined number of previous attempts to access the communications channel being greater than the maximum CW value divided by 2. Additionally or alternatively, the communications device may halve the maximum CW value in response to an average CW over the predetermined number of previous attempts to access the communications channel being smaller than the current maximum CW value divided by 4. Moreover, in response to the backoff time reaching a maximum backoff time value, the communications device may reset the CW to a minimum CW value.

BRIEF DESCRIPTION OF THE DRAWINGS

Having thus described the invention(s) in general terms, reference will now be made to the accompanying drawings, wherein:

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be applicable to a wide variety of communication environments, including, but not limited to, those involving wireless communications (e.g., cellular, Wi-Fi, WiMax, etc.), wired communications (e.g., Ethernet, etc.), Power Line Communications (PLC), or the like. For ease of explanation, several examples discussed below are described specifically in the context of PLC. As a person of ordinary skill in the art will recognize in light of this disclosure, however, certain techniques and principles disclosed herein may also be used in other communication environments.

Figure 1:
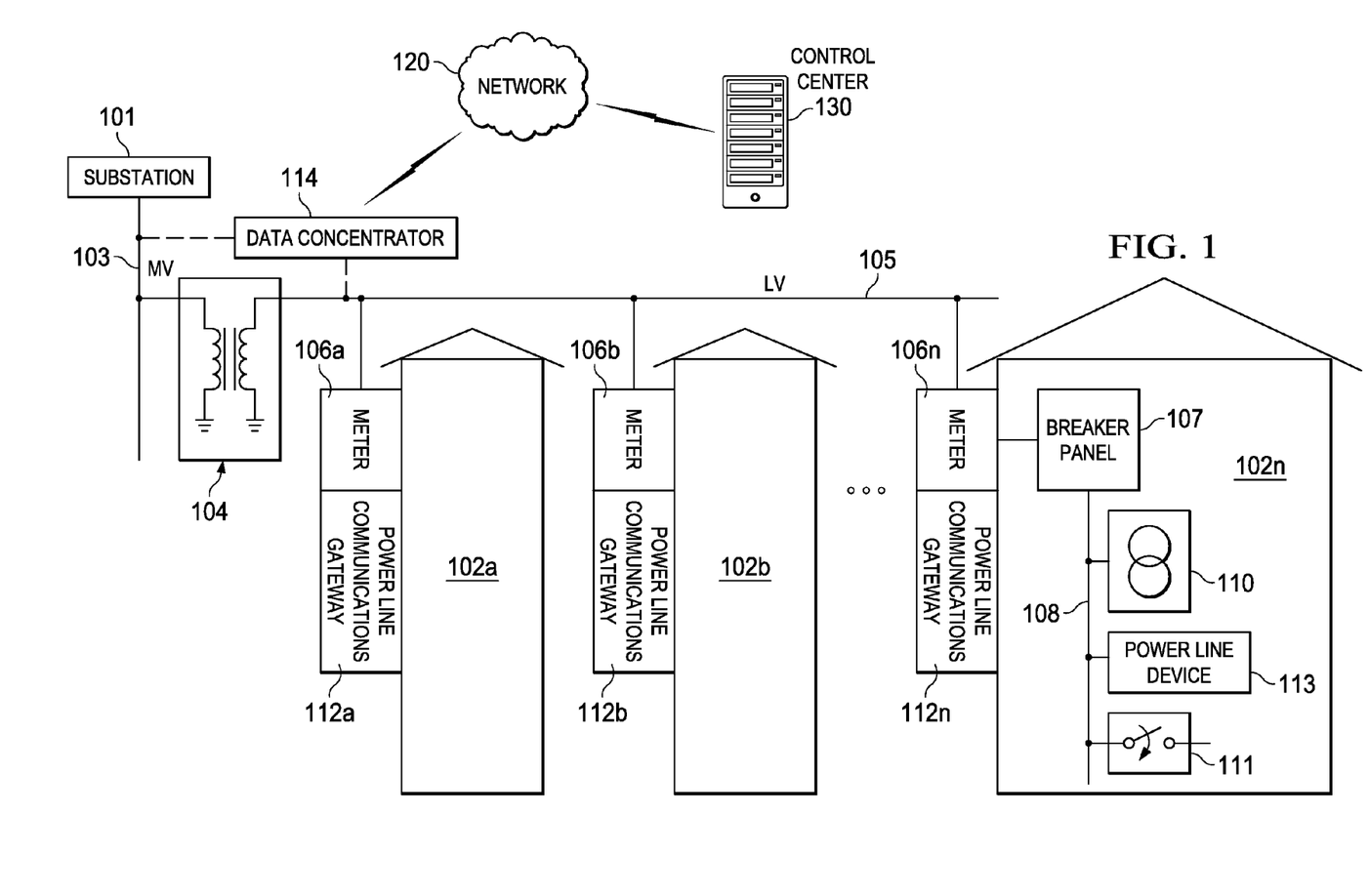
FIG. 1 is a diagram of a PLC system according to some embodiments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
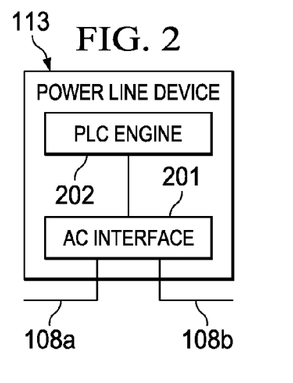
FIG. 2 is a block diagram of a PLC device or modem according to some embodiments.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
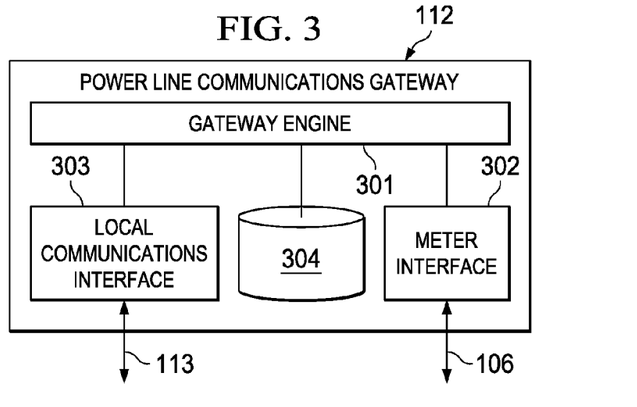
FIG. 3 is a block diagram of a PLC gateway according to some embodiments.

FIG. 3 is a block diagram of PLC gateway 112 according to some embodiments. As illustrated in this example, gateway engine 301 is coupled to meter interface 302, local communication interface 303, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

Figure 4:
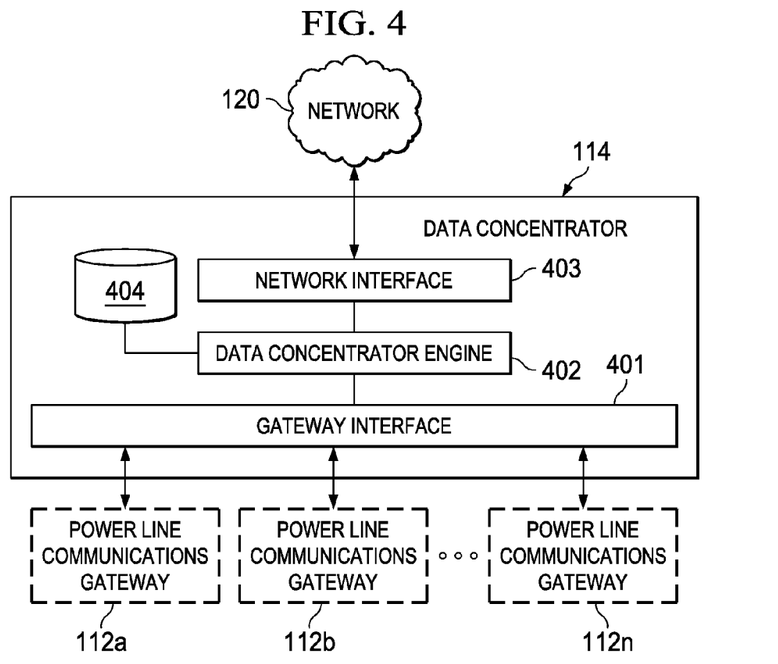
FIG. 4 is a block diagram of a PLC data concentrator according to some embodiments.

FIG. 4 is a block diagram of a PLC data concentrator according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Generally speaking, prior to transmitting a signal across power lines or wires 103, 105, and/or 108, a PLC device may attempt to detect whether a given communication or access channel (e.g., frequency band) is currently in use. Channel access may be accomplished, for example, by using the Carrier Sense Multiple Access with Collision Avoidance (CSMA/CA) mechanism with a random backoff time. The random backoff mechanism may spread the time over which PLC devices attempt to transmit, thereby reducing the probability of collision. In other words, each time a device wishes to transmit data frames, it may wait for a random period. If the channel is found to be idle or free, following the random backoff, the device may transmit its data. If the channel is found to be busy, following the random backoff, the device may wait for another random period before trying to access the channel again.

Figure 5:
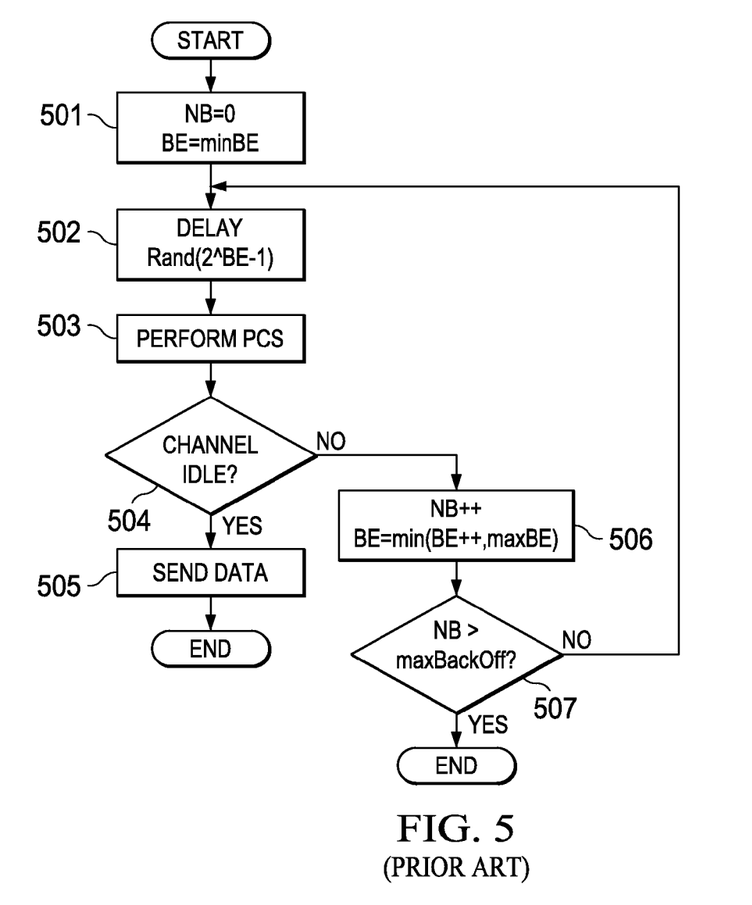
FIG. 5 is a flowchart of a prior art CSMA technique.

FIG. 5 shows a flowchart of a prior art CSMA method that may be applicable, for instance, to a non-beacon personal area network (PAN) as described in the IEEE 802.15.4 standard. This CSMA algorithm is typically used before the transmission of data or MAC command frames, and it is implemented using units of time called "backoff periods."

As illustrated in block 501, each device may maintain two variables for each transmission attempt: NB and BE. Specifically, NB is the number of times the CSMA algorithm was required to backoff while attempting the current transmission, which may be initialized to "0" before each new transmission attempt. Meanwhile, BE is the backoff exponent, which is related to a number of slots (totaling the size of a "contention window" or "CW"), each slot having a number of symbols (e.g., in IEEE p1901.2 and G3, each slot has 2 symbols) up to which a device may have to wait before attempting to access a channel (i.e., $CW=2^{BE}$), and which may be initialized to the value of minBE (i.e., $CW_{initial}=2^{minBE}$). Thus, the method may initialize NB and BE, and then proceed to block 502. At block 502, the method may create a delay for a random number K of complete slots in the range 0 to $2^{BE}-1$ (that is, within CW), and then request that a PCS operation be performed in block 503. This delay or backoff time is given by Backoff Time=K×aSlotTime; where aSlotTime is equal to the duration of a number of symbols prescribed by a given standard. At block 504, if the channel is assessed to be busy, the method may increment both NB and BE by one in block 506, while ensuring that BE does not exceed maxBE (for high priority packets, maxBE may be equal to minBE). At block 507, if the value of NB is less than or equal to a maximum number of allowed backoffs (maxCSMABackoffs), the method may return to block 502. If the value of NB is greater than maxCSMABackoffs, however, the method may terminate, for example, with a channel access failure status or indication. Returning to block 504, if the channel is assessed to be idle, the method may immediately begin transmission of the frame at block 505.

As the inventors hereof have recognized with respect to the method described in FIG. 5, however, conventional CSMA techniques do not maintain a history of CW values between transmission of different frames, and do not adjust or modify those values as a function of the success or failure of previous frame transmissions. Indeed, in conventional CSMA techniques, although CW values may be adjusted for different attempts to transmit the same frame, that value is reset for each new frame, and thus historical CW values for previous frame(s) is/are lost. Furthermore, conventional CSMA techniques also do not dynamically determine maxBE (or maxCW) or minBE (or minCW) values. As such, those techniques tend to create certain "unfairness" problems and/or increase the probability of collisions. To address these and other issues, embodiments discussed herein provide techniques that, among other things, facilitate a further spreading of the time over which devices attempt to transmit and to thereby reducing the probability of collisions using, for example, Additive Decrease Multiplicative Increase (ADMI) mechanisms. Certain aspects of these techniques may be particularly well-suited for deployment in single-hop network with a small number of devices, as well as many other environments.

Figure 6:
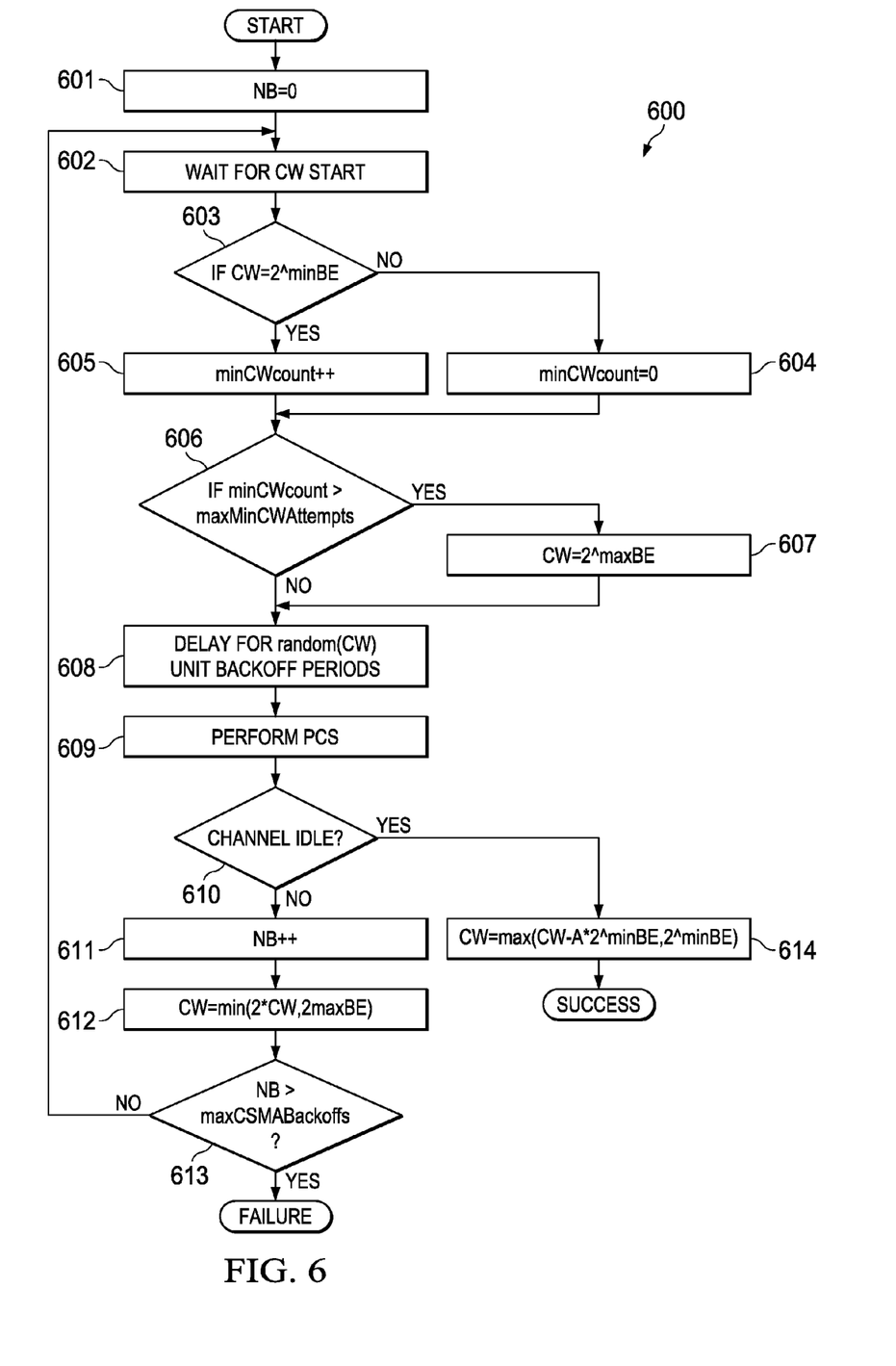
FIG. 6 is a flowchart of an Additive Decrease Multiplicative Increase (ADMI) CSMA technique according to some embodiments.

FIG. 6 is a flowchart of an Additive Decrease Multiplicative Increase (ADMI) CSMA technique. In some embodiments, method 600 may be performed, at least in part, by a communications device such as described in FIGS. 1-4 when transmitting a "normal priority" packet or frame. Generally speaking, each device may maintain three variables for each transmission attempt: NB, minCWCount, and CW. Similarly in FIG. 5 above, here NB is the number of times method 600 has been required to backoff while attempting the same, current transmission. This value may be initialized to 0 after each transmission attempt. CW is the contention window for each device. For the very first transmission attempt of the very first frame, CW may be initialized to $2^{minBE}$. In some implementations, for every channel access failure, the CW value may be increased (e.g., doubled), and the maximum value of CW ($CW_{max}$) may be bounded by $2^{maxBE}$. Upon a successful transmission, the value of CW may be adjusted as follows: $CW_{new}=CW_{current}-A*2^{minBE}$, where "A" is a linear scaling factor. Furthermore, the value of CW may be stored between transmissions of different frames. That is, upon a determination that a given frame has been successfully transmitted, the CW may retain its value for a subsequent frame transmission (instead of being re-initialized to $2^{minBE}$).

Thus, at block 601, method 600 may initialize NB. At block 602, method 600 may wait for the start of a contention window (e.g., a time during a communication superframe during which normal priority packets may be transmitted, referred to as a "normal priority" contention window in IEEE p1901.2). Blocks 603-607 implement a fairness algorithm. Particularly, at block 603, if $CW=2^{minBE}$, then a counter variable (minCWCount) is incremented at block 605; otherwise it is set to zero at block 604. Then, at block 606, method 600 determines whether minCWCount is greater than a maximum allowed value (maxMinCWCount) which controls how many times a device may use $CW=2^{minBE}$. If minCWCount>maxMinCWCount, then CW may be set to $2^{maxBE}$ (i.e., its maximum allowable size or maxCW) at block 607. Thus, using the mechanism of blocks 603-607, method 600 may ensure that CW only assumes its minimum allowed value (i.e., $CW=minCW=2^{minBE}$) for a maximum allowed number of times (i.e., maxMinCWCount), after which CW is set to its maximum allowed value (i.e., $CW=maxCW=2^{maxBE}$).

After blocks 606 and/or 607, method 600 proceeds to block 608, where the device may wait for a backoff time such that Backoff Time=K*aSlotTime and K is a random number within CW (e.g., 0<K<(CW−1) or 0<K<CW). At block 609, method 900 may perform a Physical Carrier Sense (PCS) operation to determine, at block 610, whether a given communication channel is idle. If so, then method 600 may transmit a packet, and block 614 may set CW such that $CW_{new}=\max(CW_{current}-A*2^{minBE}, 2^{minBE})$. Otherwise, method 600 may increment NB at block 611, set CW such that $CW_{new}=\min(2*CW_{current}, 2^{maxBE})$ (i.e., it may "double" the CW while ensuring that it does not exceed $2^{maxBE}$) and it may determine, at block 613, whether NB is greater than a maximum number of allowed CSMA backoffs (maxCSMA- Backoffs). If not, then control may return to block 602; otherwise method 600 may indicate a failure to transmit the packet or frame.

In some embodiments, method 600 may be used to transmit a high-priority packet or frame by replacing blocks 603-607 with an operation setting CW to $CW=2^{minBE}$. Additionally or alternatively, when a device operates in multiple a tone mask mode, blocks 602-614 may be repeated for each frequency subband.

In sum, as noted above, a node or device may start a CSMA procedure with a CW value used in the transmission of a previous frame, and it may then generate a random number K between 0 and CW (or 0 and CW−1, for example). The device may then attempt to access the channel after K*aSlotTime duration time. If the device finds the channel to be busy before and/or upon expiration of the backoff time, it may increase (e.g., double) its CW provided the new value is less than or equal to maxCW (if new value is more than maxCW, the device may maintain the current value of CW) and try to contend again (e.g., after waiting for the necessary inter frame time). In some embodiments, if a device finds the channel to be free and executes a transmission, the process may be considered a success without the need to receive an acknowledge packet in return. In other embodiments, however, the ACK packet may be required in order to the transmission to be considered a success. In those cases, if the device finds the channel to be free but it transmits the packet or frame without receiving an ACK for it (an example of a collision scenario), the device may then repeat the same process as the case where it failed to get access to channel. Conversely, if the device finds the channel to be free, transmits the packet or frame, and then receives a corresponding ACK (an example of a success scenario), then it may decrease its CW linearly by A*minCW provided the new value is greater than or equal to minCW (otherwise the device may maintain the current value of CW).

As such, the method of FIG. 6 allows each device to increase or double its CW on failure due to channel access/collision, while reducing its CW value by A*minCW upon success as long as the resultant CW value is between minCW and maxCW. In some implementations, suitable values for minCW, maxCW, and A may be 8, $2^8$, and 8, respectively. Furthermore, the method of FIG. 6 also includes a fairness mechanism that ensure any given machine only uses its CW a minCW for a maximum number of times (maxMinCW-Count). In some cases, as another fairness mechanism, if a device reaches a maximum backoff limit (equal to or distinct from maxCSMABackoff), the device may reset its CW to minCW.

Figure 7:
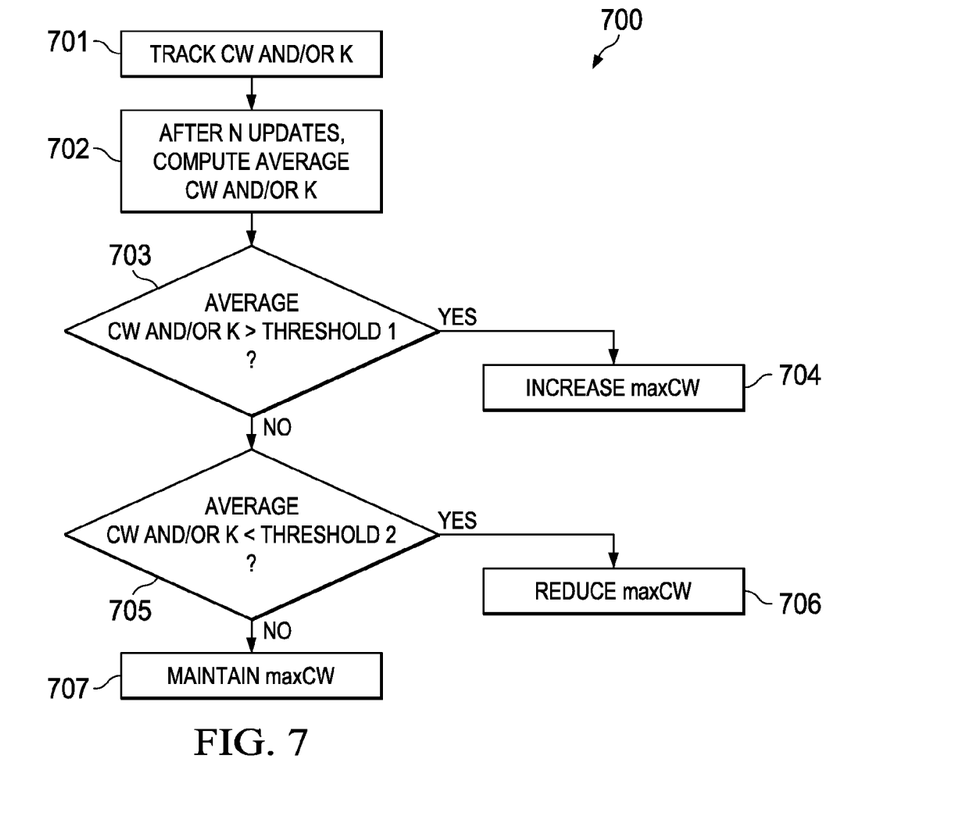
FIG. 7 is a flowchart of a method for adaptively updating a maximum contention window ("maxCW") according to some embodiments.

In some embodiments, systems and methods described herein may dynamically determine maxCW, and FIG. 7 illustrates a flowchart of such a method. Similarly as above, here method 700 may still be performed, at least in part, by a communications device such as described in FIGS. 1-4. At block 701, method 700 may keep track (e.g., in a memory) of current CW values and/or current K values. At block 702 and after N updates, method 700 may compute an average CW and/or K value. Then, at block 703, if the average CW and/or K value is greater than a first threshold (Threshold1), method 700 may increase maxCW (e.g., it may double its value) at block 704. At block 705, if the average CW and/or K value is smaller than a second threshold (Threshold2), then method 700 may reduce maxCW (e.g., it may device its value by 2) at block 706. Otherwise, at block 707, method 700 may maintain the current maxCW value in a subsequent transmission attempt.

In some embodiments, suitable values for N, Threshold1 and Threshold2 are 1000, current maxCW/2, and current maxCW/4, respectively. Moreover, minCW may also be altered depending upon the chosen CW and K similarly as described for maxCW. Thus, especially when used in combination with the method discussed in connection with FIG. 6, these techniques may provide an additively decrease and multiplicatively increase the CW values, and also enable CW values to be updated based upon the success/failure of previous transmissions without being changed or reset for every packet or frame to be serviced.

It should be noted, however, that linear decrease is but one suitable example of how to perform graceful degradation from maxCW. Other mechanisms to reduce the CW in response to successful transmission of a packet, for example, include using a logarithmic decreasing function, a quadratic decreasing function, and/or other polynomial decreasing function. Similarly, multiplicative increase is but one suitable example of how to perform a backoff (as used in exponential backoff) in response to lack of channel access and/or collision, for example. Other mechanisms also include using a logarithmic decreasing function, a quadratic decreasing function, and/or other polynomial decreasing function.

Figure 8A:
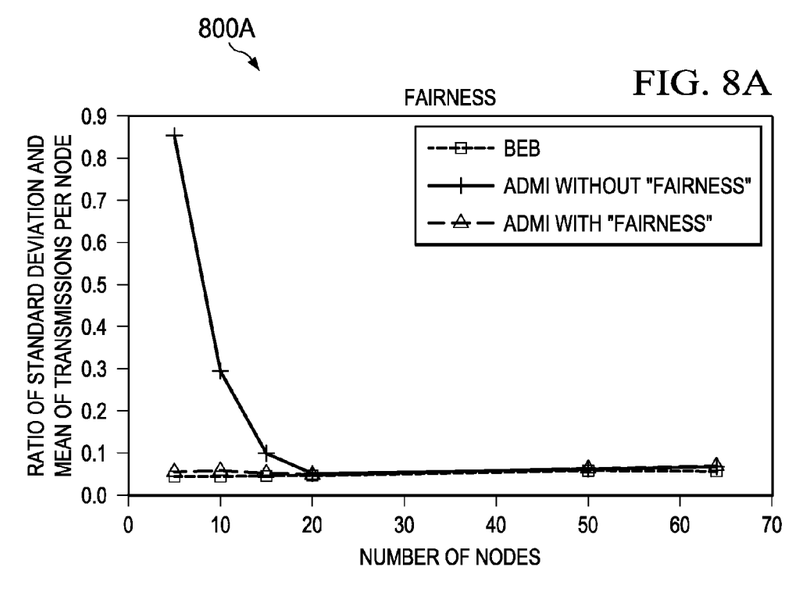
FIGS. 8A and 8B are graphs of the ratio of standard deviation over mean of transmissions per node and average throughput, respectively, according to some embodiments.
Figure 8B:
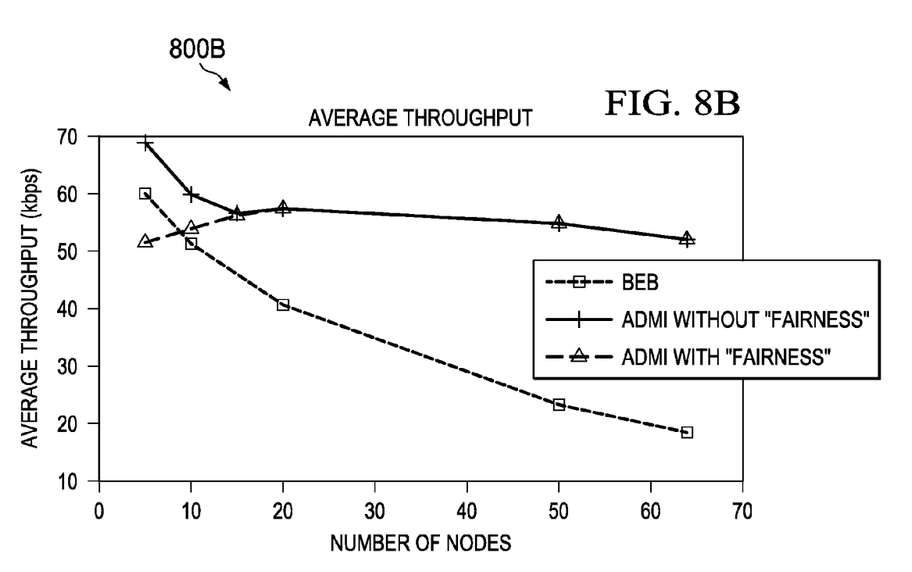

FIGS. 8A and 8B are graphs of the ratio of standard deviation over mean of transmissions per node (i.e., a measure of "fairness") and average throughput, respectively, according to some embodiments. Particularly, graphs 800A and 800B show results of method 600 of FIG. 6 with ("ADMI-with fairness") and without ("ADMI-without fairness") implementation of blocks 603-607, respectively, both of which are compared against Binary Exponential Back-Off (BEB) technique provided by the G3 PLC standard. As illustrated, it may be seen that although the "ADMI-without fairness" curve of graph 800A shows unfairness (here measured as a ratio of standard deviation and mean of transmissions per node) compared to the BEB curve, particularly when the number of nodes is smaller than 20 (above which fairness is approximately equal), whereas the "ADMI-with fairness" curve shows similar fairness results as BEB. Meanwhile, the throughput of both the "ADMI-without fairness" and the "ADMI-with fairness" curves in graph 800B are both significantly higher than for the BEB curve, particularly when the number of nodes is 10 or greater.

Figure 9:
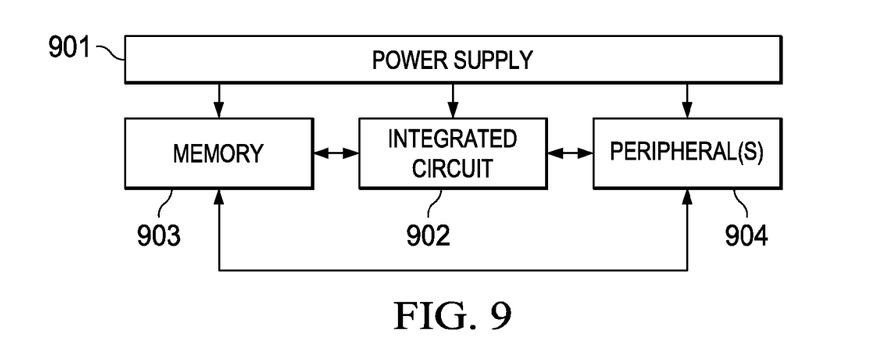
FIG. 9 is a block diagram of an integrated circuit according to some embodiments.

FIG. 9 is a block diagram of an integrated circuit according to some embodiments. In some cases, one or more of the devices and/or apparatuses shown in FIGS. 2-4 may be implemented as shown in FIG. 9. In some embodiments, integrated circuit 902 may be a digital signal processor (DSP), an application specific integrated circuit (ASIC), a system-on-chip (SoC) circuit, a field-programmable gate array (FPGA), a microprocessor, a microcontroller, or the like. Integrated circuit 902 is coupled to one or more peripherals 904 and external memory 903. In some cases, external memory 903 may be used to store and/or maintain databases, variables, counters, etc. Further, integrated circuit 902 may include a driver for communicating signals to external memory 903 and another driver for communicating signals to peripherals 904. Power supply 901 is also provided which supplies the supply voltages to integrated circuit 902 as well as one or more supply voltages to memory 903 and/or peripherals 904. In some embodiments, more than one instance of integrated circuit 902 may be included (and more than one external memory 903 may be included as well).

Peripherals 904 may include any desired circuitry, depending on the type of PLC system. For example, in an embodiment, peripherals 904 may implement local communication interface 303 and include devices for various types of wireless communication, such as WI-FI, ZIGBEE, BLUETOOTH, cellular, global positioning system, etc. Peripherals 904 may also include additional storage, including RAM storage, solid-state storage, or disk storage. In some cases, peripherals 904 may include user interface devices such as a display screen, including touch display screens or multi-touch display screens, keyboard or other input devices, microphones, speakers, etc.

External memory 903 may include any type of memory. For example, external memory 903 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 903 may include one or more memory modules to which the memory devices are mounted, such as single inline memory modules (SIMMs), dual inline memory modules (DIMMs), etc.

It will be understood that various operations illustrated in FIGS. 6 and/or 7 may be executed simultaneously and/or sequentially. It will be further understood that each operation may be performed in any order and may be performed once or repetitiously. In various embodiments, the blocks shown in FIGS. 6 and/or 7 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 6 and/or 7 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
performing, by a communications device,
    maintaining at least three variables for each attempt to transmit a packet: number of backoff times (NB), contention window for the communications device (CW), and a counter variable (minCWCount);
    waiting for a start of a contention window;
    waiting for a backoff time such that Backoff Time=K*aSlotTime and K is a random number within CW−1;
    determining whether a given communication channel is idle;
        if channel is idle, transmitting a packet;
            setting CW such that $CW_{new}=\max(CW_{current}-A*2^{minBE}, 2^{minBE})$;
        if channel is not idle, incrementing NB;
            setting CW while insuring that CW does not exceed a threshold;
        determining whether NB is greater than a maximum number of allowed CSMA backoffs (maxCSMA-Backoffs); and
        indicating a failure to transmit the packet, if NB is greater than a maximum number of allowed CSMA backoffs (maxCSMABackoffs).

2. The method of claim 1, further comprising:
initializing CW to $2^{minBE}$ wherein BE is backoff exponent.

3. The method of claim 1, wherein "A" is a linear scaling factor.

4. The method of claim 1, further comprising implementing a fairness algorithm.

5. The method of claim 4, wherein implementing said fairness algorithm includes:
    if $CW=2^{minBE}$, then said incrementing said counter variable (minCWCount);
        otherwise setting said counter variable (minCWCount) to zero.

6. The method of claim 5, further comprising determining whether minCWCount is greater than a maximum allowed value, which controls how many times a device may use $CW=2^{minBE}$.

7. The method of claim 6, wherein the maximum allowed value is maxMinCWCount and further comprising if minCWCount>maxMinCWCount, then CW may be set to $2^{maxBE}$.

8. The method of claim 1, further comprising increasing said CW, wherein CW is bounded by $2^{maxBE}(CW_{max})$.

9. The method of claim 1, further comprising storing a value of CW between transmissions of different packets.

10. The method of claim 1, wherein determining whether a given communication channel is idle includes performing a Physical Carrier Sense (PCS).

11. A method, comprising:
performing, by a communications device,
    maintaining at least three variables for each attempt to transmit a frame:
        number of backoff times (NB), contention window for the communications device (CW), and a counter variable (minCWCount);
    waiting for a start of a contention window;
    waiting for a backoff time such that Backoff Time=K*aSlotTime and K is a random number within CW−1;
    determining whether a given communication channel is idle;

if channel is idle, transmitting a frame;
  setting CW such that $CW_{new} = \max(CW_{current} - A*2^{minBE}, 2^{minBE})$;
if channel is not idle, incrementing NB;
  setting CW while insuring that CW does not exceed a threashold;
determining whether NB is greater than a maximum number of allowed CSMA backoffs (maxCSMABackoffs); and
indicating a failure to transmit the frame, if NB is greater than a maximum number of allowed CSMA backoffs (maxCSMABackoffs).

12. The method of claim 11, further comprising:
initializing CW to $2^{minBE}$ wherein BE is backoff exponent.

13. The method of claim 11, wherein "A" is a linear scaling factor.

14. The method of claim 11, further comprising implementing a fairness algorithm.

15. The method of claim 14, wherein implementing said fairness algorithm includes:
if $CW=2^{minBE}$, then said incrementing said counter variable (minCWCount); otherwise setting said counter variable (minCWCount) to zero.

16. The method of claim 15, further comprising determining whether minCWCount is greater than a maximum allowed value, which controls how many times a device may use $CW=2^{minBE}$.

17. The method of claim 16, wherein the maximum allowed value is maxMinCWCount and further comprising if minCWCount>maxMinCWCount, then CW may be set to $2^{maxBE}$.

18. The method of claim 11, further comprising increasing said CW, wherein CW is bounded by $2^{maxBE}(CW_{max})$.

19. The method of claim 11, further comprising storing a value of CW between transmissions of different frames.

20. The method of claim 11, wherein determining whether a given communication channel is idle includes performing a Physical Carrier Sense (PCS).

* * * * *